(No Model.)  3 Sheets—Sheet 1.

T. G. P. VOGT.
LAND OR WATER VELOCIPEDE.

No. 477,160.  Patented June 14, 1892.

WITNESSES:
J. A. Bergstrom
E. M. Clark

INVENTOR:
T. G. P. Vogt
BY Munn & Co.
ATTORNEYS (No Model.) 3 Sheets—Sheet 2.

T. G. P. VOGT.
LAND OR WATER VELOCIPEDE.

No. 477,160. Patented June 14, 1892.

WITNESSES:
J. A. Bergstrom
E. M. Clark

INVENTOR:
T. G. P. Vogt
BY Munn & Co.
ATTORNEYS (No Model.) 3 Sheets—Sheet 3.

T. G. P. VOGT.
LAND OR WATER VELOCIPEDE.

No. 477,160. Patented June 14, 1892.

WITNESSES:
J. A. Bergstrom
E. M. Clark

INVENTOR:
T. G. P. Vogt
BY Munn & Co.
ATTORNEYS

UNITED STATES PATENT OFFICE.

THEODORE G. P. VOGT, OF PASSAIC, NEW JERSEY.

LAND AND WATER VELOCIPEDE.

SPECIFICATION forming part of Letters Patent No. 477,160, dated June 14, 1892.

Application filed October 30, 1891. Serial No. 410,298. (No model.)

*To all whom it may concern:*

Be it known that I, THEODORE G. P. VOGT, of Passaic, in the county of Passaic and State of New Jersey, have invented a new and useful Improved Land and Water Velocipede, of which the following is a full, clear, and exact description.

The objects of this invention are to provide a compact, light, strong vehicle which will be adapted for manual propulsion on land or water without change of adjustment or alteration of parts, and that will afford means for the transportation of several persons on land or upon considerable bodies of water in an expeditious and safe manner.

To these ends my invention consists in the peculiar construction and combination of parts, as is hereinafter described, and indicated in the claims.

Reference is to be had to the accompanying drawings, forming a part of this specification, in which similar letters of reference indicate corresponding parts in all the figures.

Figure 1:
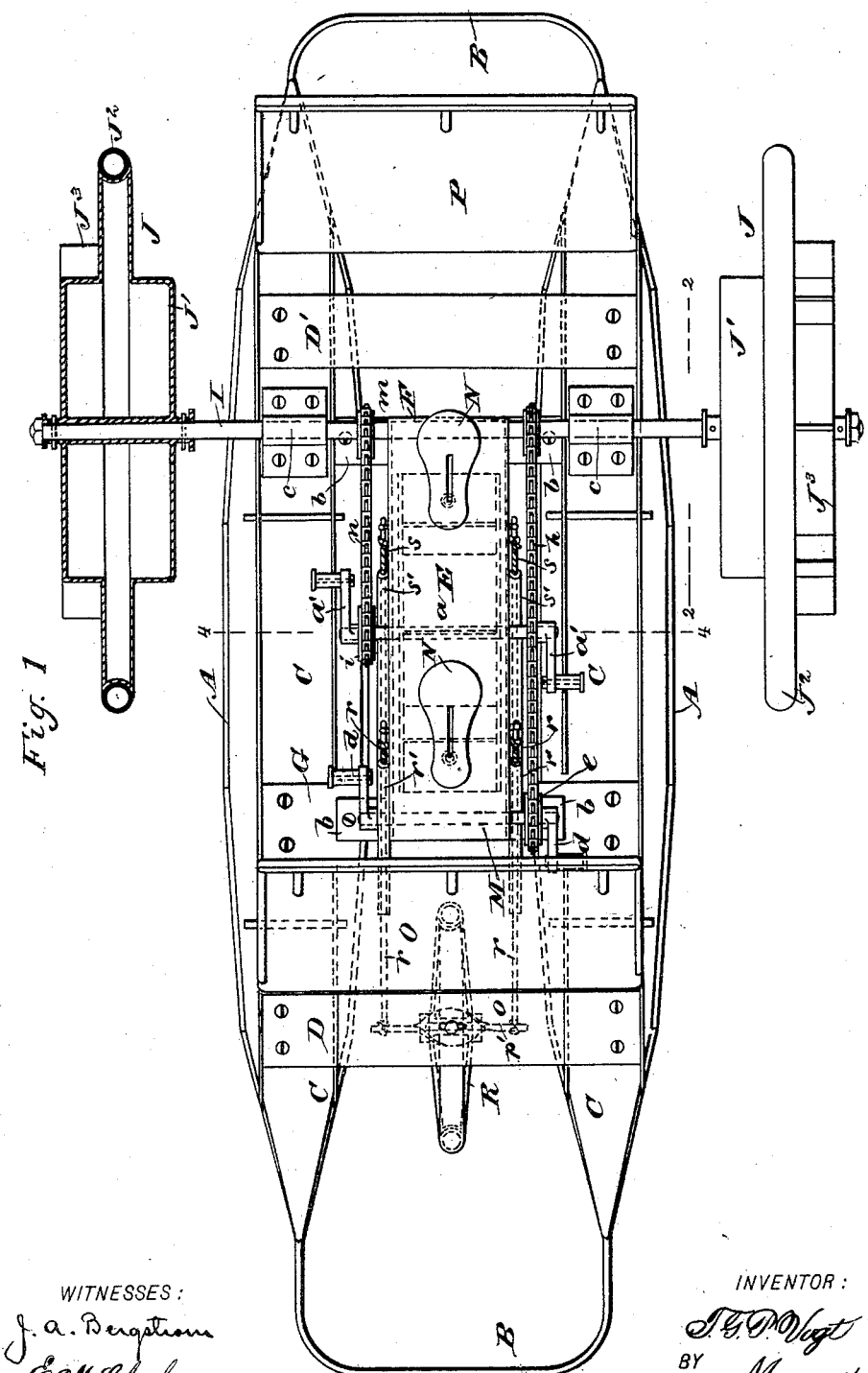
Figure 2:
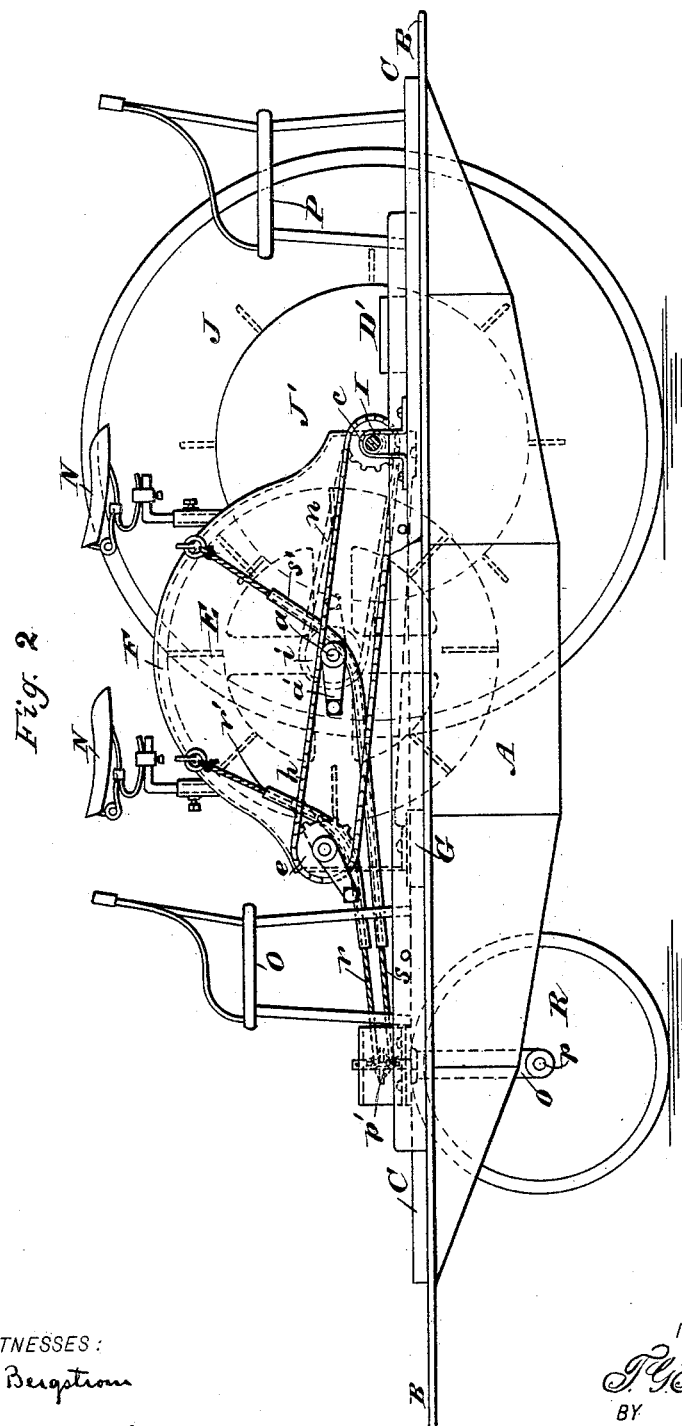
Figure 3:
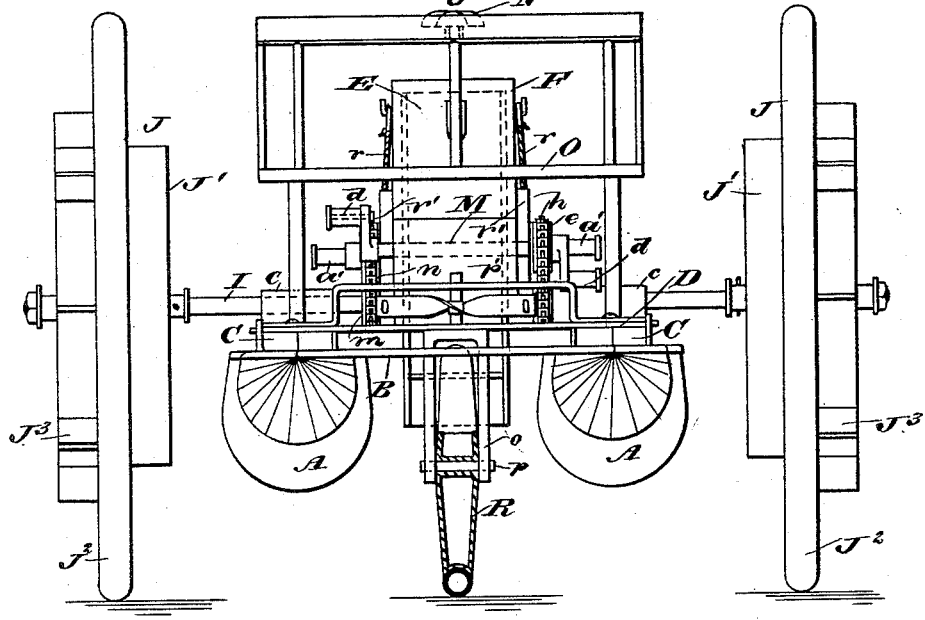
Figure 4:
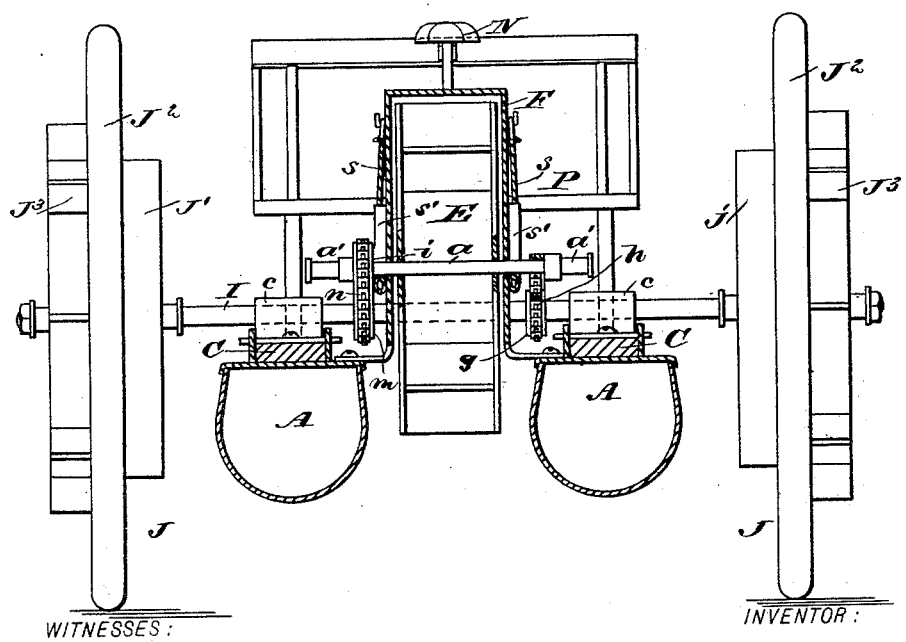

Figure 1 is a plan view, partly in section, of the device. Fig. 2 is a side view of the vehicle with one wheel removed to expose other parts, partly in section, on the line 2 2 in Fig. 1. Fig. 3 is a front end view, partly in section; and Fig. 4 is a transverse section taken on the line 4 4 in Fig. 1.

Two similar boat-hulls A are provided having proper length and other dimensions to afford the required buoyancy, these parts being preferably made of thin sheet metal that is light and strong, and, as indicated in Fig. 1, the hulls are tapered toward each end, so as to adapt them for easy propulsion and to facilitate manipulation, so as to move freely in any direction while immersed in water.

The twin hulls A are secured parallel together and separated a proper distance by the yoke-bars B, which are preferably bent from pipe or metal bars to give them a graceful curve, and have the ends of each yoke affixed to the terminals of the hulls in a substantial manner.

The hulls A are hermetically sealed, having flat deck-walls whereon wooden frame stringers C in plank form are secured and connected together by the transverse plank foot-boards D D', the latter-named pieces being located at a suitable distance apart and from each end of the hulls.

Between the hulls A and near their longitudinal center a paddle-wheel E is rotatably supported by a loose engagement of its center shaft $a$ with the oppositely-perforated walls of the enveloping case F, which completely covers the upper portion of the wheel or all that projects above the decks of the hulls A. Said wheel-case has bracket-lugs $b$ projected from its lower edge laterally, which seat upon a cross-board G and also upon the frame-stringers C, to which they are affixed by screws or bolts, so as to sustain the wheel-case above and around the paddle-wheel a short distance removed from it to permit the latter to be rotated.

Upon projected ends of the shaft $a$ oppositely-projected cranks $a'$ are secured, whereon the usual pedals for foot-pressure are mounted.

At the rear of the wheel-case F a transverse main axle I is rotatably supported in pedestal-boxes $c$, which are affixed upon the frame-stringers C by bolts or screws, said axle extending an equal and proper distance outside of the hulls A at each side and furnished with similar wheels J.

The wheels mentioned are constructed preferably of thin sheet-steel plates, or other light sheet metal having strength and durability, there being double walls provided for each wheel, forming a considerably-sized air-chamber $J'$ in each wheel-body, which chambers are cylindrical and project laterally from the central portions, that are of greater diameter and have concave peripheries to receive and retain the tubular elastic tires $J^2$, and on the circumference of the air-chamber portions that project from the outer sides of these wheels spaced paddle-wings $J^3$ are radially projected to engage water when the device is afloat.

Forwardly of the paddle-wheel E a pedal-shaft M is transversely and rotatably supported in the sides of the wheel-case F, and therefrom projected an equal degree, these end portions having cranks $d$ and pedals on the latter for a rotative movement by foot-pressure, the cranks projecting oppositely, as usual, to adapt them for a continuous and regular movement.

Preferably on the left side of the vehicle there is a sprocket-wheel $e$, secured upon the pedal-shaft M between the side of the wheel-case F and the crank $d$ at this end of said shaft, and a similar sprocket-wheel $g$ is affixed upon the axle I, these wheels being rotatably connected by an endless sprocket-chain h that engages their peripheries. On the opposite side of the wheel-case F a sprocket-wheel i is secured upon the paddle-wheel shaft a between the crank on this shaft end and the wheel-case, an aligning sprocket-wheel m being mounted and fastened on the axle I to receive an endless sprocket-chain n, that engages the rim-edges of each wheel and interlocks with teeth thereon.

At convenient points for service spring-saddles N are adjustably mounted forward and rearward upon the wheel-case F, and at the front a transverse bench O is secured to the frame-stringers C, the front plank cross-piece D forming a foot-board for persons occupying the bench. At the rear of the wheel-case F another bench P is placed across the hulls A for accommodation of passengers, the foot-board D' being conveniently located in advance of the rear bench.

Below the transverse forward foot-board D a third wheel R for the machine is centrally journaled and swivel-supported on a furcated bracket-frame o, that has its journaled upper end portion projected through the foot-board free to rotate, and is secured loosely by any suitable means, the wheel being rotatably supported by a cross-pin p that engages the limbs of the bracket-frame between which said wheel is located.

As the wheel R is designed to be utilized for steering purposes while on the land or in the water, means are provided to enable the riders who occupy the saddles N to turn it and the bracket-frame o for such a purpose. To this end a steering-bar p' is affixed to the journaled upper end portion of the bracket-frame, having two cords r s attached to each end of the bar, which cords are rearwardly extended and pass through two guide-tubes r' s' on each side of the wheel-case F, to which the latter are secured, each being bent to lead the cords near to each saddle so that either rider may grasp the upper end of a cord and direct the course of the vehicle on land or in water, the wheel serving as a rudder in the latter element.

As the principal parts of the device are made to contain air, or if desired, a gas lighter than air, so that when in water the vehicle becomes a floating raft provided with means for propulsion and directive control, the advantages resulting are manifest. For instance, cross-country tourists, couriers, exploring parties, or those traveling on country roads for business or pleasure, can use the velocipede with great advantage, as in case a stream has to be crossed the vehicle can be run directly into the water and is at once available to convey the occupants across in a safe and expeditious manner. It is also evident that as a life-saving device at coast stations the facility with which the vehicle may be employed as a floating raft renders it valuable, it being only necessary to mount it and drive it as a tricycle to the beach and thence directly into the water without loss of time. As the operation of the machine is self-evident, it is not considered necessary to give a detailed description of the manipulation.

Having thus described my invention, what I claim as new, and desire to secure by Letters Patent, is—

1. In a land and water velocipede, the combination, with two spaced air-tight hulls, a transverse axle, two hollow tricycle-wheels thereon, and a forward hollow steering-wheel, of a paddle-wheel rotatable on the hulls between the same, and a treadle propelling-gear connected to the paddle-wheel and main tricycle-wheels, substantially as described.

2. In a land and water velocipede, the combination, with two elongated air-tight hulls held spaced apart, a transverse axle rotatable thereon, two main chambered tricycle-wheels on the axle, having hollow tires and radial paddle-blades thereon, a forward hollow steering-wheel supported between the hulls to swivel laterally and rotate, and a paddle-wheel between the hulls on a treadle-shaft rotatably supported in the side walls of a wheel-case on the hulls, of a treadle propelling-gear connected to the axle and paddle-wheel shaft, two saddles above the hulls, and cords to control the steering-wheel extended toward the saddles, substantially as described.

3. In a land and water velocipede that is provided with two spaced air-tight hulls, a water-wheel within a wheel-case on the hulls, and means to rotate the water-wheel, of two main tricycle-wheels having cylindric air-chambers, radial paddle-blades thereon, elastic tires on the wheel-peripheries, a hollow steering-wheel located forwardly between the hulls, adapted to swivel and rotate, a tire thereon, and a steering device which may be operated from seats on the wheel-case, substantially as described.

4. In a land and water velocipede, the combination, with two elongated and end-tapered hulls that are air-tight and held spaced apart by a yoke-bar at each end, a water-wheel between the hulls near the center, having radial buckets, a wheel-case above the water-wheel, a transverse rotatable axle, and two hollow main tricycle-wheels thereon having laterally-extending cylindric air-chambers, radial paddle-blades thereon, and a peripheral elastic tire, of a forward hollow air-tight steering-wheel adapted to swivel and rotate between the hulls, two saddles on the wheel-case, located at the front and rear, treadle-gears below on the wheel-case for each saddle, sprocket gearing and chains connecting the treadle-gear with the axle, and cords leading from a steering-gear on the steering-wheel to points near the saddles, substantially as described.

THEODORE G. P. VOGT.

Witnesses:
JULIUS C. GRIMMELL,
HENRY DOES.